United States Patent [19]

Myntti et al.

[11] 4,403,283
[45] Sep. 6, 1983

[54] EXTENDED MEMORY SYSTEM AND METHOD

[75] Inventors: Jon N. Myntti, Martinsville, Ind.;
Kirk P. Anderson, Phoenix, Ariz.;
Jay R. Hosler, Santa Cruz, Calif.

[73] Assignee: NCR Corporation, Dayton, Ohio

[21] Appl. No.: 173,208

[22] Filed: Jul. 28, 1980

[51] Int. Cl.[3] .............................................. G06F 3/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,778,776 | 12/1973 | Hakozaki | 364/200 |
| 3,970,999 | 7/1976 | Edward | 364/200 |
| 4,040,029 | 8/1977 | Young | 364/900 |
| 4,042,911 | 8/1977 | Bourke et al. | 364/900 |
| 4,053,948 | 10/1977 | Hogan et al. | 364/200 |
| 4,056,848 | 11/1977 | Gilley | 364/200 |
| 4,057,848 | 11/1977 | Hayashi | 364/200 |
| 4,218,743 | 8/1980 | Hoffman et al. | 364/200 |

*Primary Examiner*—Charles E. Atkinson
*Attorney, Agent, or Firm*—J. T. Cavender; Albert L. Sessler, Jr.; Elmer Wargo

[57] ABSTRACT

An extended memory system includes a processor, a plurality of input/output devices, a real memory having first and second portions thereof, the first portion storing a system operation program and the second portion storing a plurality of user programs. The processor produces logical addresses when executing user programs or input/output routines, which logical addresses are translated to real memory addresses by one of two first translation memories. System operation instructions common to all user programs are stored in a low order address portion of the real memory. Different user programs are mapped into mutually exclusive portions of the real memory by means of the two translation memories.

12 Claims, 14 Drawing Figures

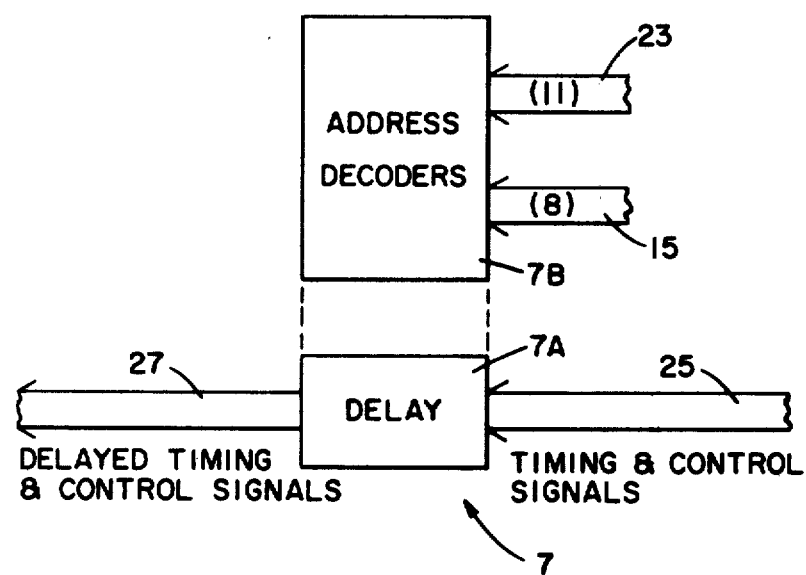

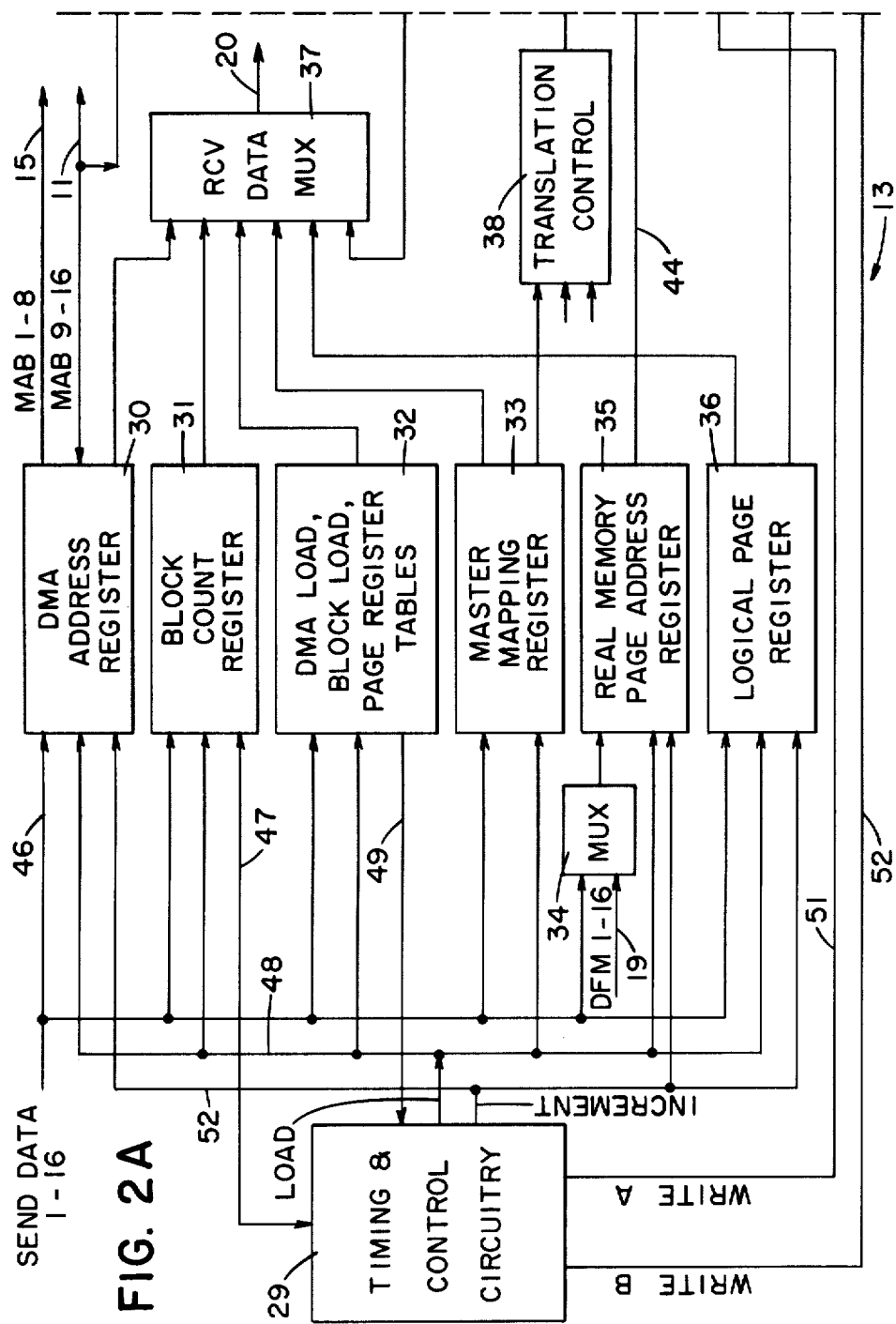

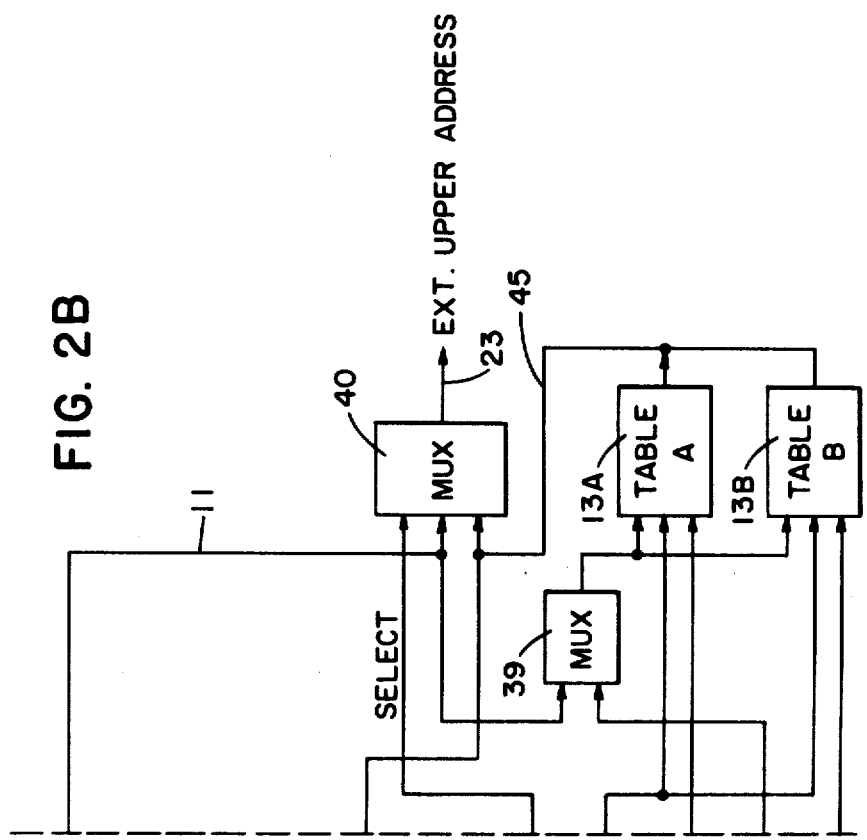

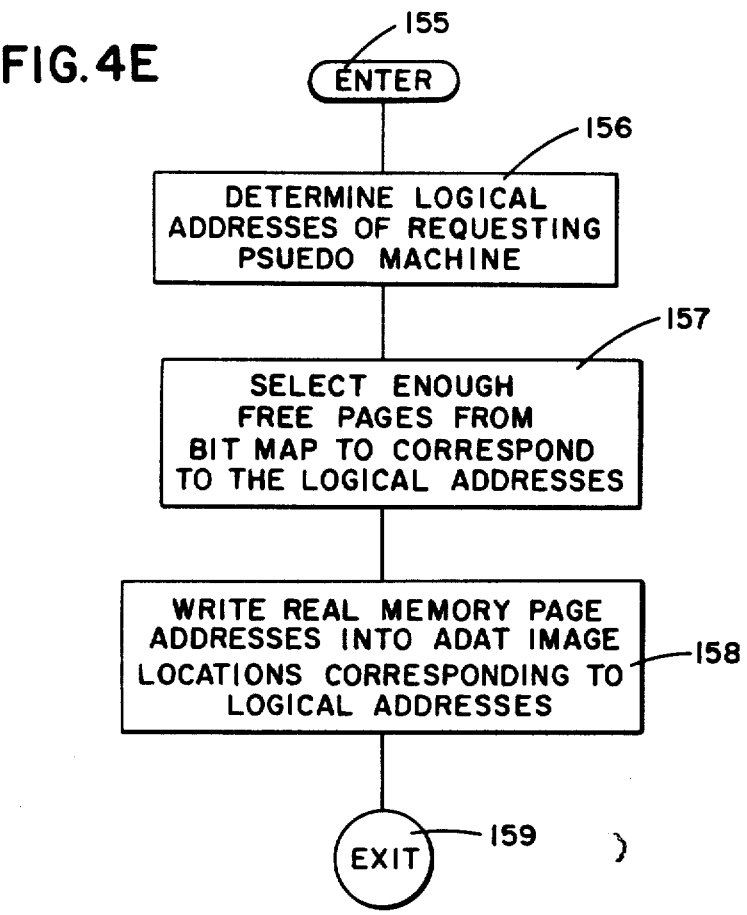

EXTENDED MEMORY SYSTEM AND METHOD

BACKGROUND OF THE INVENTION

1. Field of the Invention

The invention relates to systems and methods for efficiently effecting utilization of a memory having $2^N$ addressable locations by a processor having fewer than N address outputs and to systems and methods for avoiding memory storage problems which result from inadequately regulated memory contention by multiple user programs.

2. Description of the Prior Art

A problem common to many processors is that they are capable of generating only a finite number of address bits for addressing memory, hereinafter frequently referred to as "real memory". For example, a 16 bit processor is capable of addressing only 65,536 words of memory. However, it is highly desirable that a processor be able to address "extended memories" having much larger numbers of words, especially in systems in which a plurality of user programs are stored and executed on a time-sharing basis. A common technique for accomplishing this result is to utilize address translators. Address translators are special memory devices which contain extended page addresses of real memory locations. Part of an address generated by the processor (hereinafter referred to as a "logical address") is utilized to fetch such an extended page address from the address translator. The extended page address is combined with a second part of the logical address to produce an extended address having enough address bits to address each word of the entire real memory. Execution of a user program typically involves three separate types of memory activities, referred to as program execution, input/output execution, and operating system execution. If a system utilizes only a single address translation memory, that address translation memory must be subdivided into three sections, each corresponding to a respective one of the three memory activities. The logical address utilized for execution of the operation system program and the input/output routines require utilization of an unduly large proportion of the logical address which the processor is capable of producing, thereby limiting the amount of logical address space available for execution of each user program. (The foregoing approach to extended memory operation is shown in U.S. Pat. No. 4,042,911). Alternatively, the number of logical addresses available for execution of user programs can be increased by adding additional address translators for execution of input/output routines and operating system routines. However, this approach is unduly costly.

A "memory shortage" problem frequently occurs in computing systems which execute a number of user programs on a time-shared basis. The "memory shortage" problem is a consequence of unregulated memory contention among the various time-shared user programs. The memory shortage problem arises when a number of user programs are loaded into the computing system without regard for the maximum memory requirements of each such user program. A deadlock condition can arise when a particular user program occupies a particular amount of the real memory, and is refused an additional amount of memory (needed to complete execution of the particular user program) by a "memory manager routine" because a block of memory sufficiently large to allow the execution of the present user process is unavailable. Such a deadlock condition often can be relieved only by terminating execution of one or more user programs (which have been loaded into the computing system and are being executed on a time-shared basis). This may occur at arbitrary times, and the possibility of loss of data at such times is high. The foregoing problem is further aggravated because a particular user program may run to completion on one occasion but fail on another occasion due to differences in the "mixes" of various user programs which can be executed on a time-shared basis. Often, when a particular user program's request for additional memory is rejected there is enough total free memory space to satisfy the request, but the available memory is not contiguous. As memory utilization increases above 80%, this type of situation (referred to as "fragmentation") increases dramatically. The "software burden" of a computing system is substantially increased if the operating system includes the capability of collecting fragmented portions of free memory to make them available to a requesting user program. There is an unmet need for a computing system which is capable of optimally utilizing expanded memory with a minimum amount of both hardware and software.

Accordingly, it is an object of the invention to provide an improved system and method for accessing an expanded memory system utilizing an optimum mix of hardware and software.

Another object of the invention is to provide an expanded memory system and method which avoid memory shortage problems caused by unregulated memory contention among user programs.

A further object of the invention is to provide an expanded memory system which provides maximum logical address space for each user process executed with a minimum amount of address translation memory.

Another object of the invention is to provide an expanded memory system and method which ensure that each user program loaded into the system can be executed to completion without likelihood of a shortage of memory interrupting or terminating the execution of that user program.

SUMMARY OF THE INVENTION

Briefly, described, and in accordance with one embodiment thereof, the invention provides an expanded memory computing system which maps logical addresses produced by execution of a plurality of user programs through a first translation memory into a corresponding plurality of mutually exclusive portions of a real memory. The system also maps logical addresses produced by execution of I/O operations through a second translation memory into other respective mutually exclusive portions of the real memory. In the described embodiment of the invention, the system includes a 16 bit processor, a universal dynamic address translator (UDAT) including the first and second translation memories, each including 256 words. Each word includes an 11 bit page address of a page stored in the real memory which includes 262,144 words. Eight upper order addresses produced on an address bus by the processor or by an I/O device connected to the address bus perform the function of addressing the translation memories and are utilized to select the desired page addresses. The lower order eight bits of addresses produced on the address bus select one of the 256 words of each selected page. A system operation program is stored in the lowest order portion of the real memory and is executed without any address translation. Various software structures, including a plurality of UDAT images, are stored in the next lowest order portion of the real memory. The remaining portion of the real memory is available for execution of user programs. Mutually exclusive sections of the remaining portion of the real memory are allocated to requesting user programs. Consequently, each user program can be executed to completion without likelihood of experiencing a shortage of memory if that user program does not attempt to use more memory than has been allocated to it. Before any user program can be executed, a UDAT image containing the page address of the portion of the real memory exclusively allocated to that user program must loaded into the first 256 bit translation memory. The logical addresses produced by the processor during execution of that user program are then mapped through the first 256 bit translation memory to that exclusively allocated portion of the real memory. Logical addresses produced during execution of I/O operations are mapped through the second 256 bit translation memory, wherein an appropriate UDAT image is stored, to other portions of the real memory, which portions are exclusive of the portions allocated to the user programs. Each user program can share other programs loaded into the system if a share command specifying the programs to be shared is first executed by the system. In response to a share command, a share routine loads programs to be shared by the present user if there is sufficient available address space in the real memory.

In one mode of operation, a COBOL user program includes a software buffer into which I/O data to be loaded into a disk unit is temporarily stored until the buffer is filled. The I/O data is entered into the buffer by mapping logical addresses representing the buffer through a UDAT image, which is previously loaded into the first translation table, to corresponding pages of real memory buffer locations. When the buffer is filled, an I/O routine is executed in the next lowest order portion of the real memory, producing logical addresses which address the second translation memory. The second translation memory contains a UDAT image which also contains the real memory page number in which the I/O data is stored. The execution of the I/O routine thereby transfers all of the I/O data stored in the buffer portion of the real memory into the disk unit with a single accessing of the disk unit. In another mode of operation, instructions executed in a few reserved pages of the lowest order portion of the real memory are mapped through the second translation memory to any portion of the real memory, allowing the system operation routine access to a limited sized block of any portion of the real memory.

BRIEF DESCRIPTION OF THE DRAWINGS

FIG. 1A is a block diagram illustrating circuitry included in the memory interface portion of FIG. 1.

FIGS. 2A and 2B together show a detail blocked diagram of the universal address translator (UDAT) block 13 of FIG. 1.

FIGS. 4A-4G disclose flow charts which are useful in explaining the operation of the extended memory system of FIG. 1.

DESCRIPTION OF THE INVENTION

Figure 1:
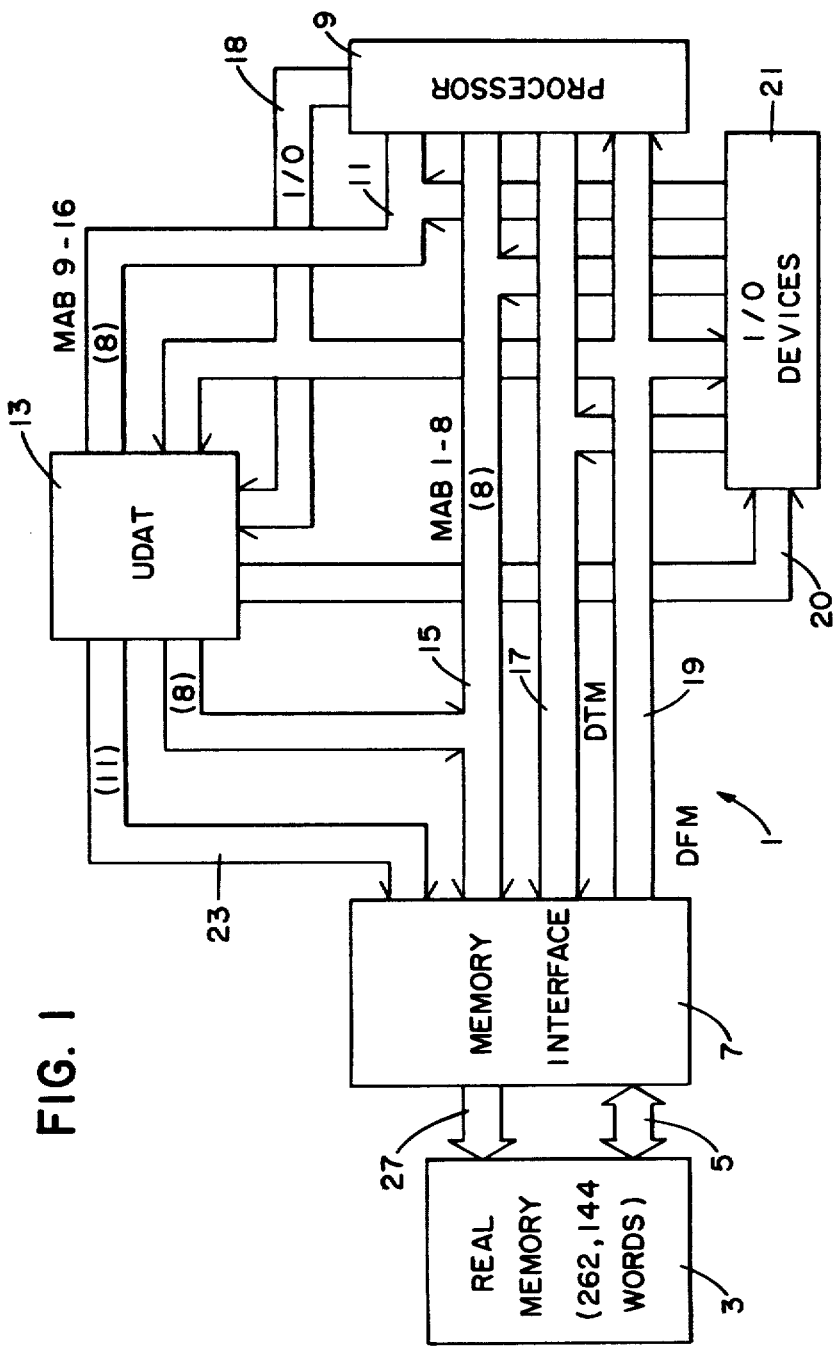
FIG. 1 is a block diagram of the extended memory comprising system of the present invention.

Referring to FIG. 1, extended memory system 1 includes a main memory 3, which, in the described embodiment of the invention, includes 262,144 words. Extended memory system 1 also includes a memory interface circuit 7, which is connected to main memory 3 (frequently referred to as real memory 3) by means of a bidirectional bus 5. Bus 5 is utilized for transferring both addresses and data between main memory 3 and memory interface circuit 7. Bus 27 conducts various memory control signals from memory interface circuit 7 to real memory 3. Processor 9 is connected to memory interface circuit 7 by means of bus 17, which conducts data from processor 9 to memory interface circuit 7, and by data bus 19, which conducts data from memory interface circuit 7 to processor 9. Address bus 15 conducts eight low order address bits from processor 9 to memory interface circuit 7. A universal dynamic address translator (UDAT) 13 performs the function of translating eight "upper level" address bits (i.e., high order address bits) produced on upper level address bus 11 by processor 9 to produce eleven "extended upper level page addresses". Upper level address bus 11 has eight conductors for conducting eight upper address bits to inputs of UDAT 13. Extended upper level address bus 23 includes 11 conductors, which are connected between outputs of UDAT 13 and memory interface circuit 7. Processor 9 is a "16 bit machine", meaning that it is capable of providing 16 bit address outputs and therefore is capable of directly addressing 65,536 memory locations (i.e., 16 bit memory words). As subsequently explained, the upper eight address bits MAB9-16 address one of two tables, referred to as Table A and Table B, respectively, contained in UDAT 13. Table A includes 256 twelve bit words. The first eleven bits of each word, hereinafter referred to as the "translation word", constitute an extended page address which is inputted to memory interface circuit 7. The eight lower level address bits MAB1-8 (which address the individual 16 bit words within a page) on bus 15 and the eleven extended upper level address bits on bus 23 constitute an extended 19 bit address. The extended 19 bit address is capable of addressing any 65,536 word portion of the 262,144 word real memory 3, thereby expanding the addressing capability of processor 9.

Figure 3:
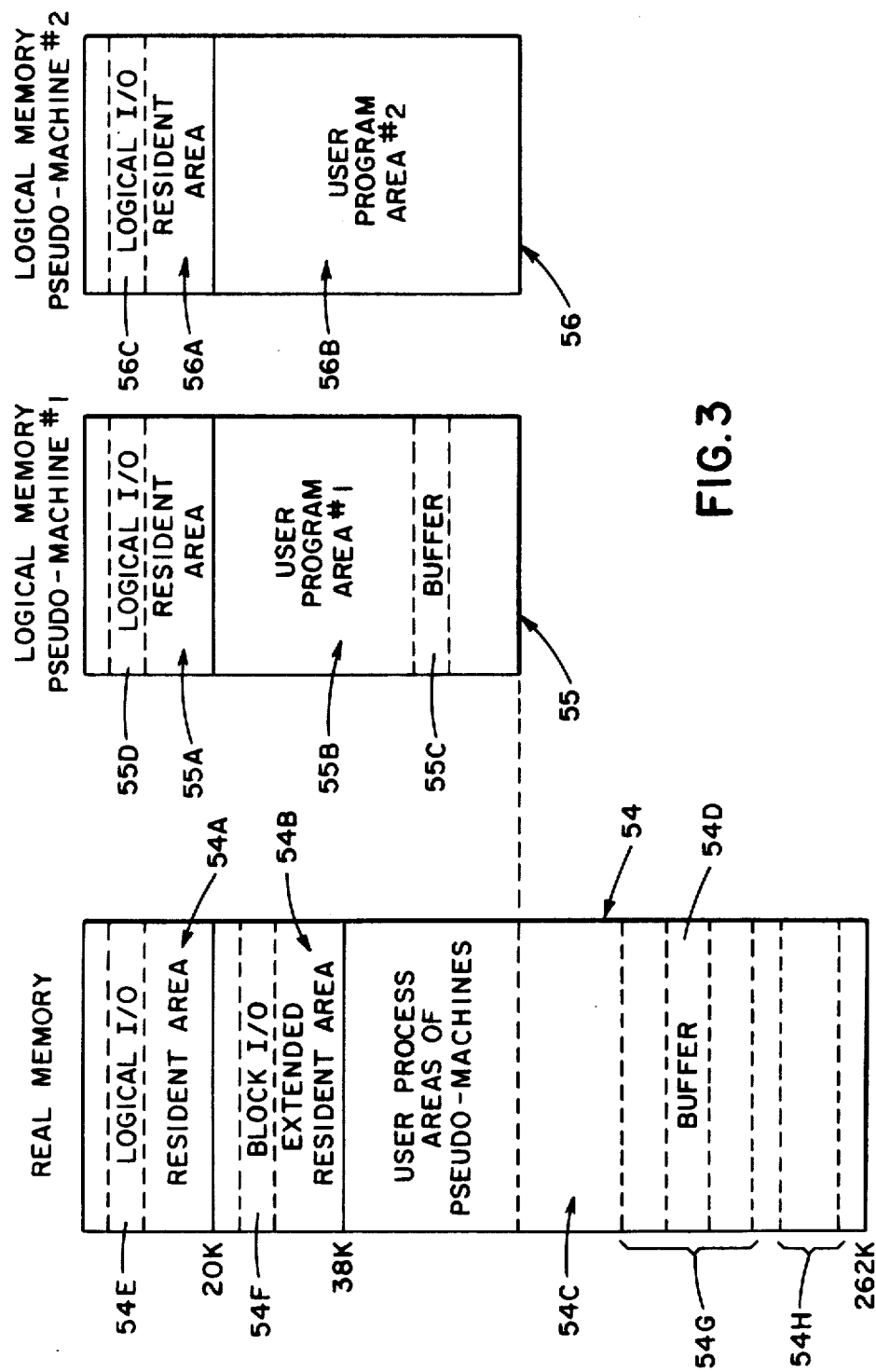
FIG. 3 is a memory map useful in explaining the operation of the extended memory computing system of FIG. 1.
Figure 3A:
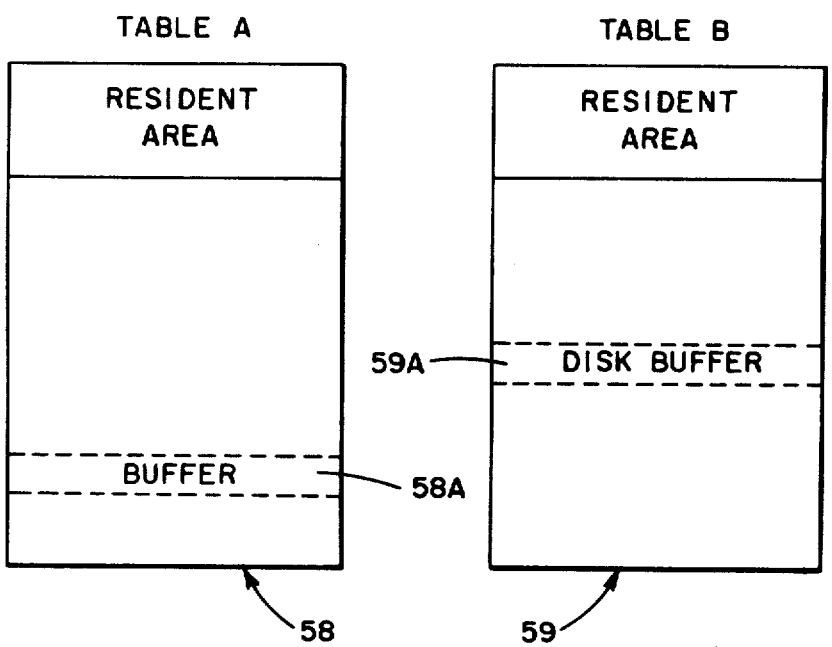
FIG. 3A is another memory map useful in explaining the operation of the extended memory computing system.
Figure 3B:
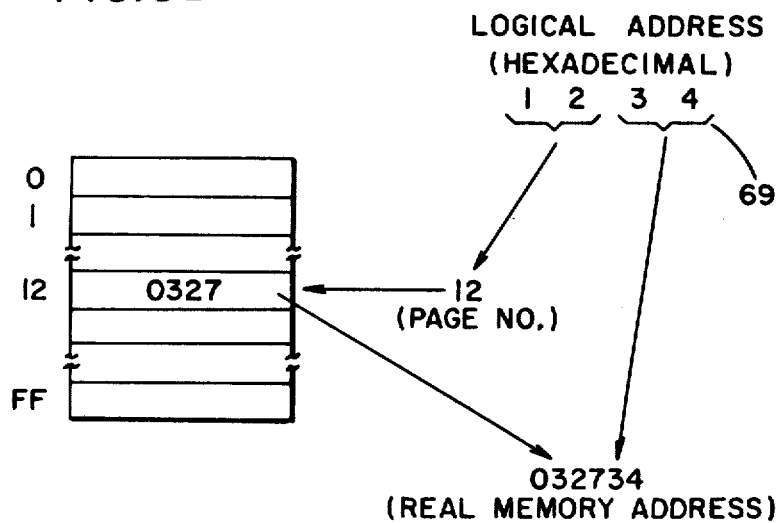
FIG. 3B is another map useful in explaining the operation of the extended memory computing system.

FIG. 3B shows an example of the mapping achieved by means of Table A and Table B. Reference numeral 69 represents a typical 16 bit logical address produced by processor 9. The hexadecimal number "12" represents the value of the upper order eight bits of logical address 69, and the hexadecimal number "34" represents the lower order eight bits of logical address 69. For example, hexadecimal number "12" selects the location of Table A in which is stored the real memory page number of real memory address to which logical address 69 is to be mapped. Hexadecimal number "34" represents the particular word of that page to which logical address 69 is to be mapped. In this example, the subject page number is stored in hexadecimal location 12 of Table A and has the hexadecimal value 0327. This number includes twelve binary bits, eleven of which are used to designate the real memory page number. These eleven bits are concatenated with the binary equivalent of the hexadecimal number "34" to produce a 19 bit extended address (which is the binary equivalent of hexadecimal "032734").

Lower address bus 15 is connected to outputs of UDAT 13 in order to permit UDAT 13 to operate in a direct memory access (DMA) mode, subsequently explained. Data bus 19 is connected to the inputs of UDAT 13 to facilitate loading of Table A and Table B of UDAT 13, as subsequently explained. I/O devices 21, which may, for example, include a disk unit, a keyboard, a CRT, or various other common I/O devices, are connected to data buses 17 and 19, and also to address buses 11 and 15.

The system shown in FIG. 1 is incorporated into a machine known as the NCR 8200. This machine is capable of executing a plurality of user programs, including COBOL programs, on a time-shared basis. This 16 bit addresses outputted by processor 9 are referred to herein as "logical addresses". Logical addresses produced by processor 9 to effect execution of a particular user program are "mapped" through Table A of UDAT 13 to produce extended 19-bit addresses which are then utilized to address real memory 3. Logical addresses produced by processor 9 to effect execution of input/output operations are mapped through Table B to effect addressing of real memory 3. Bus 18, referred to an I/O bus, conducts various I/O control and selection signals to UDAT 13. Bus 20 conducts certain ones of the I/O control and selection signals from UDAT 13 to I/O devices 21. Some of the I/O control signals program certain ones of the registers and counters of UDAT 13, shown in more detail in FIG. 2. Some of the I/O control signals program various ones of the I/O devices 21, setting them up to take control of the address and data buses in FIG. 1 when those I/O devices come to the highest priority portion in a conventional priority interrupt system. System operation routines required to be executed in order to effect execution of the user programs and input/output routines are stored in a lower portion (i.e., a portion addressed by low address numbers of main memory 31), and are addressed directly by the logical addresses produced by processor 9, without being mapped through UDAT 13.

Every time that processor 9 switches to a different user program, it is necessary to reload Table A of UDAT 13, so that logical addresses produced by processor 9 in order to execute that user program are mapped into a portion of real memory 3 which has been assigned exclusively to that user program. In accordance with the present invention, a plurality of mutually exclusive portions of real memory 3 are exclusively assigned to the respective user programs executed by processor 9, except that certain user processes can be "shared" as subsequently explained.

As subsequently explained, the technique of assigning separate mutually exclusive portions of main memory to corresponding user programs avoids the previously mentioned memory shortage problems resulting from computing systems wherein there is inadequately regulated or unregulated memory contention among various user programs. As will subsequently become clear, the use of lower logical address locations of real memory 3 for executing the system operation routine without mapping and using higher address locations of real memory 3 for executing input/output routines by mapping higher order logical addresses through Table B of UDAT 13 and also using higher order logical address locations for executing a plurality of user programs by mapping logical addresses through Table A into corresponding mutually exclusive portions of real memory 3 results in an optimum amount of logical address space being available for execution of each user program by processor 9.

The foregoing system allows processor 9 to execute the various time-shared user programs loaded therein "transparently" from the complications of utilizing an extended main memory having a larger number of locations than can be directly addressed by the 16 bit logical addresses produced by processor 9. Stated differently, in the extended memory system shown in FIG. 1, various mutually exclusive portions of main memory 3 can be "mapped into" by a logical address space of 65,536 addresses, whereby execution of each user program is "isolated" from execution of each other user program. In effect, each user program has its own "dedicated" portion of real memory 3, which dedicated portion may be as large as 65,536 words. Since each user program executed by processor 9 can be executed independently of the memory requirements of any other user program executed by processor 9, it is convenient herein to load into the computing system and refer to each user program executed thereby as a "pseudo machine". The entire 262,144 words of main memory 3 can be used for executing a plurality of user programs, although the logical address space for any one user process is still limited to the 65,536 words which can be addressed by the 16 bit address words produced by processor 9.

As shown in FIG. 1A, memory interface circuit 7 includes address decoders 78, which receive extended upper address bus 23 and lower address bus 15 as inputs. The outputs of address decoder 7B are coupled to bus 5, and select subgroups of dynamic memory chips contained in real memory 3.

Delay circuit 7A delays timing and control signals on bus 25 by an amount sufficient to allow UDAT 13 to perform the abovementioned address translation operations. This ensures that timing and control signals produced by processor 9 (which include various read/write, chip select, and enable signals) are applied to main memory 3 in proper synchronization with the extended address signals produced on bus 11 by UDAT 13.

Before describing the operation of the extended memory computing system of FIG. 1, it will be helpful to first explain in detail both the structure and operation of UDAT 13. Referring now to FIGS. 2A and 2B, UDAT 13 includes two separately addressable random access memories 13A and 13B. Hereinafter, memory 13A will be referred to as "Table A" and memory 13B will be referred to as "Table B". Each of Table A and Table B contains 256 twelve bit words, and each is implemented by means of three 256 word by four bit high speed bi-polar Fairchild 93422 random access memory integrated circuit devices. Each word contained in Tables A and B is referred to as a translation word and contains a "page" address, i.e., the address of a "page" in real memory 3. Each page includes 256 words which are addressable by the eight lower order address bits MAB1-8 conducted by bus 15, also shown in FIG. 1. UDAT 13 also includes a multiplexer circuit 39 which has a plurality of outputs coupled to corresponding address inputs of Table A and Table B. One group of inputs of multiplexer 39 are coupled to respective conductors of upper address bus 11, and another set of inputs of multiplexer 39 are coupled to outputs of logical page register 36. Multiplexer circuit 39 can be implemented by means of a plurality of Texas Instruments 74S157 2-to-1 multiplexer integrated circuits. UDAT 13 also includes a multiplexer circuit 40 (which can be implemented by means of a plurality of Texas Instruments 74S158 2-to-1 multiplexer integrated circuits), the outputs of which are connected to conductors of bus 23, on which the above-mentioned extended upper address is produced. One group of inputs of multiplexer circuit 40 are connected to the respective conductors of upper address bus 11. Another group of inputs of multiplexer circuit 40 are connected to the outputs of the two random access memories constituting Tables A and B, which are connected to the eleven conductors of bus 45. The eleven conductors of bus 45 are also connected to one group of inputs of multiplexer circuit 37, which may be implemented by means of Texas Instruments 74153 4-to-1 multiplexer integrated circuits. The function of the output of multiplexer 37 is to provide the above-mentioned I/O control and selection signals on bus 20.

A "select" input is applied to multiplexer circuit 40 to determine whether the signals produced by either (1) Table A or Table B or (2) the signals on the right conductors of upper address bus 11 are multiplexed to the eleven conductors of bus 23. This select input is produced by translation control circuitry 38, which includes simple logic circuitry that can be easily implemented by any one skilled in the art who knows the conditions of master mapping register 33 under which foregoing multiplexing operations are to be performed.

Master mapping register 33 (which can be implemented by means of three Texas Instruments 74174 latches integrated circuits) is loaded by means of three conductors of bus 46. Bus 46, referred to as the "send data" bus, conducts data produced by programmed commands by means of an arithmetic logic unit in processor 9. Bus 46 is included in I/O bus 18, mentioned above. Master mapping register 33 includes three latches which define eight possible operating states of UDAT 13, of which only three are pertinent to the present invention. A load signal produced by timing and control circuitry 29 effects loading of the three latches constituting master mapping register 33.

UDAT 13 includes DMA (direct memory access) address register 30, which may be implemented by means of Texas Instruments 74193 counter/register integrated circuits. DMA address register has inputs connected to the respective conductors of bus 46. The eight lower order bits of DMA address register 30 are connected to the respective conductors of lower order address bus 15, and are utilized by UDAT 13, to generate lower order address bits MAB1-8 in one mode of operation wherein UDAT 13 operates as a DMA device. The eleven conductors of upper order address bus 11 also are connected to DMA address register 30. The sixteen terminals of DMA address register 30 are connected to one set of inputs of multiplexer 37. "Block count register" 31 (which can be implemented by means of Texas Instruments 74S374 integrated circuit latches) has outputs connected to multiplexer 37. Block count register 31 also produces output signals to timing and control circuitry 29. Block 32 of FIG. 2 has outputs connected to inputs of receive data multiplexer 37, and is loaded from bus 46 by means of the above-mentioned load signal produced on conductor 48 by timing and control circuitry 29. Multiplexer 37 allows information in any of the blocks of writing converted to its inputs to be selectively routed to the processor 9, if desired.

Block 32 produces an output on conductor 49 which output is connected to timing and control circuit 29.

Real memory page address register 35 has outputs connected to corresponding inputs of Tables A and B by means of conductors 44. Real memory page address register 35 is loaded either with data from bus 46 or with data from bus 19 by means of multiplexer 34, which can be implemented by means of a Texas Instruments 74157 2-to-1 integrated circuits.

The "state" loaded into master mapping register 33 controls how UDAT 13 maps addresses received from processor 9 onto upper order address bus 11. Addresses received from processor 9 via upper order address bus 11 are categorized as "processor addresses"; these are addresses which are involved with execution of user programs or associated input/output subroutines. Other types of addresses are utilized only for input/output operations, and are referred to as "I/O" addresses. In one of the modes of operation of UDAT 13, processor addresses received on upper order address bus 11 are not translated, and are multiplexed directly onto page address bus 23 by means of multiplexer circuit 40 in response to translation control circuit 38, which in turn responds to a corresponding state stored in master mapping register 33.

In another operating state, all processor addresses received on upper order address bus 11 are utilized to address Table A, which produces 11 bit extended addresses on conductor 45. The extended 11 bit page addresses on conductor 45 are fed through multiplexer circuit 40 onto bus 23. (The 12th bit of each word stored in Table A and in Table B is utilized for a "memory protection" function not pertinent to the invention and therefore not discussed herein).

In another operating state, stored in master mapping register 33, input/outut addresses on upper order address bus 11 are multiplexed by means of multiplexer circuitry 39 into Table B which effects selection of 11 bit addresses which are multiplexed through multiplexing circuit 40 onto page address bus 23 in order to effect addressing of main memory 3. In yet another state of operation, the highest order 8 pages of a portion of the logical memory space referred to herein as the "resident" memory space (subsequently described), are multiplexed to the address inputs of Table B, which generates the 11 bit page address (i.e., extended upper address signals) signals utilized to address real memory 3. The latter feature enables the extended memory computing system of FIG. 1 to execute user programs implemented by means of the well known COBOL programming language, wherein the COBOL user programs can create software "buffers" in the logical address space of the corresponding pseudo-machines.

Timing and control circuitry 29 generates a "write A" signals and a "write B" signal on conductors 51 and 52, respectively, in order to select either Table A or Table B to effect loading of translation words therein in accordance with the needs of the user program to be executed or the I/O operation to be executed. UDAT 13 may be loaded in three different ways. First, any individual word or register of either Table A or Table B may be loaded with individual page addresses of a particular memory page of real memory 3. Stated differently, any word of Table A or Table B may be loaded to point to a particular memory "page" of main memory 3. In order to load an individual word or "page register" of Table A or Table B, the address of the desired word is loaded in logical page register 36. This information to be loaded into the selected word location is then inputted via conductor 44 and real memory page address register 35.

Second, any number of consecutive words or registers of either of Table A or Table B may be loaded with consecutive memory addresses of real main memory 3 by specifying an initial page address, and also specifying how many consecutive words or registers of that table (Table A or Table B) are to be loaded, and causing those words or registers to be consecutively loaded with translation words from real memory 3.

Block counter register 31 contains a number which defines how many logical page registers of Table A or Table B are to be loaded in the "increment block loading mode". In this mode, any number of consecutive words or page registers within either Table A or Table B can be loaded with consecutive real memory page addresses. The logical page register 36 is incremented to select successive logical page addresses of the selected one of Table A and B. Real memory page address register 35 is a register/counter, so that it can be incremented from the first address loaded into it in order to effect the above described incremented block load operation.

Third, any number of consecutive registers of Table A or Table B may be loaded utilizing direct memory addressing from a table of page addresses stored in the portion of real memory 3 referred to as the "extended resident".

In order to load a block of data into Table A or Table B, an initial address can be loaded into DMA address register 30 (which is actually a counter/register) by means of bus 46. DMA address register circuitry 30 when is via conductor 52 incremented by means of timing and control circuitry 29, causing a block of data beginning with the initial address loaded into DMA address register 30 to be loaded into Table A or Table B. This is the usual method of loading Table A and Table B when processor 9 switches from one user program to another or switches to an input/output routine. Data is received from real memory 3 via bus 19, passed through multiplexer 34 and real memory page address register 35 and outputted via bus 44 into the selected one of Table A and Table B. Output lines MAB9-16 (bus 11) are outputted from DMA address register 30 to effect loading of Table A or Table B in the case where an initial address is loaded in DMA address register 30, as mentioned above. DMA address register 30 is incremented from that initial address to address a block of successive addresses of real memory 3 in order to load the contents of that block of addresses into the selected one of Table A and Table B. Thus, address translator 13 functions as a DMA device in this mode of operation.

In one of the operating states of UDAT 13, when user programs are being executed by processor 9, logical addresses produced by processor 9 will be mapped through Table A to real memory 3, and input/output operation logical addresses will be mapped through Table B. In another operating state, when I/O device driver structures or routines are being executed, processor 9 will map logical addresses through Table B and input/output logical addresses will also be mapped through Table B. In a third state, no mapping will be performed for logical addresses outputted by processor 9 except for the addresses of the last eight pages of the resident portion of the pseudo-machine being executed, which addresses are mapped through Table B, allowing system operation routines to address any real memory page in main memory 3.

As previously mentioned, the addresses produced by processor 9 on address buses 11 and 15 (referred to collectively as address bus 11, 15) can be referred to as "logical address". The addresses actually applied to real memory 3 are referred to as "real addresses" or "physical addresses". Each user program executed on a time-shared basis by processor 9 operating in the 65,536 word logical address space of processor 9 can be viewed as a separate "pseudo-machine" which is executed without regard for the memory requirements of any other user program executed by processor 9.

For example, in FIG. 3, the 65,536 word logical memory space of a first pseudo-machine, referred to as pseudo-machine 1, is shown by memory map 55. Similarly, the 65,536 word logical memory space of a second pseudo-machine, referred to as "pseudo-machine 2" is shown by memory map 56. Pseudo-machines 1 and 2 are said to be operating when their corresponding user programs are being executed in processor 9. The memory map of real memory 3 is designated in FIG. 3 by reference numeral 54. Portion 54A of real memory map 54 is mapped through either Table A or Table B but the logical addresses of portion 54A are identical to the real addresses into which those logical addresses are mapped (with one exception, explained subsequently). Portion 54A of real memory map 54 is referred to as the "resident" portion of real memory 3. The resident portion 54A corresponds to approximately the lowest order 20,000 words of real memory 3. Since the 20,000 words are not mapped (i.e., are not translated by means of either Table A or Table B) they are also included in the logical memory space of pseudo-machine 1 and pseudo-machine 2 (and every other pseudo-machine executed by processor 9) as indicated in memory maps 55 and 56, wherein resident portions 55A and 56A of memory maps 55 and 56, respectively, are also labeled as resident portions thereof.

The system operation program previously mentioned is stored and executed in resident portion 54A or real memory 3, as are the subsequently mentioned logical I/O routine, physical device driver routines, and various other software structures.

A second portion of real memory 3, corresponding to the "extended resident" portion 54B of memory map 54, includes locations approximately between the 20,000 and 38,000 address locations of real memory 3. None of the "extended resident" logical address space of any pseudo-machine operating as a time-shared basis in processor 9 is mapped into any portion of real memory 3. In other words, the extended resident portion of the real memory cannot be mapped through either Table A or Table B. Extended resident portion 54B of real memory 3 includes the subsequently mentioned block I/O routine and the UDAT images.

The resident portion of the logical memory space of any pseudo-machine is unvialable for execution of non-common portions of any pseudo-machine, since the resident portion of the logical memory space is utilized for execution of the "system operation program", which is utilized on execution of all user programs. However, portion 55B of memory map 55 is available for execution of the non-common portion of pseudo-machine 1, and portion 56B of memory map 56 is available for execution of non-common portions of pseudo-machine 2.

At this point, it should be emphasized that if processor 9 executes a user program (i.e., as the corresponding pseudo machine is executed) that pseudo-machine is completely "unaware" that any other pseudo-machine executed on a time-shared basis by processor 9 uses the same real memory 3. Stated differently, a pseudo-machine does not "share" any portion of the real memory space into which its logical address space is mapped with any other pseudo-machine because, although each pseudo-machine has available to it the entire 65,536 words of logical address space addressable by processor 9, except the approximately 20,000 words constituting the resident portion thereof, those logical addresses are mapped into different, mutually exclusive portions of real memory 3 dedicated to the respective pseudo-machine executed on a time-shared basis by processor 9. (The real memory space of real memory 3 is allocated or dedicated to the various user programs during "initialization" of the system shown in FIG. 1, as subsequently explained with reference to the "size" routine.)

FIG 3A shows two memory maps 58 and 59, labeled "Table A" and "Table B", respectively. As previously mentioned, each of Table A and Table B represents a 256 word by 11 bit memory addressed by the uper order eight logical addresses outputted by processor 9 when it executes user programs or operation routines or the like. Each word of Table A and Table B contains the address of a page of real memory 3. Table A is utilized to map each pseudo-machine logical address space into real memory 3, and Table B is utilized to map the logical space of all I/O software buffers and also, I/O software driver structures into real memory 3.

Operation of the system of FIG. 1 perhaps can be better understood by an explanation of how the system operates to effect execution of a plurality of user programs, at least one of which is written in COBOL programming language. COBOL user programs typically contain software tables and software structures such as buffers (a series of contiguous logical memory locations constituting a software register reserved for temporarily storing data transferred to or from an I/O device, especially a disk unit) in the course of execution of a user program, which buffers must be addressable by the above mentioned system operation routine. For example, if the COBOL user program makes a series of computations to be transferred to a disk unit, a software buffer of the type described above is included in the COBOL user program for assembling a suitably large block of such data, which block of data then is transferred to the disk unit by means of a single execution of a "block I/O" routine stored in the extended resident portion of real memory 3, instead of by means of a large number of excessively time-consuming single-word transfers of that data to the disk unit. This greatly reduces the amount of time required for transfer of data to and from the disk unit compared to the time which would be required if each word of data were individually transferred to or from the disk unit, since each disk transfer is a very slow operation compared to a transfer to real memory 3.

Assume that in the foregoing example, the COBOL user program makes certain calculations, creating data which eventually must be stored in the disk unit. Each word of such data is temporarily stored in the above-mentioned buffer of the COBOL user program. Since the 16 bit logical address space of processor 9 (except the resident portion thereof) is translated by mapping via Table A to real memory 3 during execution of a user program, the data is created by the COBOL user program stored in the real memory locations determined by the page addresses stored in the portion of Table A represented by the logical address space received for the buffer. This will be better understood by considering the COBOL user program to be represented by pseudo-machine 1 in FIG. 3. Reference numeral 55C represents the above-mentioned COBOL buffer, which is addressed by processor 9 when the above-mentioned data is transferred by the COBOL user program (i.e., pseudo-machine 1) to real memory 3. These logical addresses are mapped via Table A (which has been loaded with a suitable "UDAT image" corresponding to pseudo-machine 1 before execution of pseudo-machine 1 has begun) to locations of real memory 3 represented by reference numeral 54D in the real memory map 54 of FIG. 3.

When buffer 55C is completely filled by such data (for purposes of explanation it is convenient to refer to buffer 55C in pseudo-machine 1 as being "full" even though actually it is the buffer portion of real memory 3 represented by portion 54D of memory map 55 which is filled with the data), the COBOL user program then makes a request to a routine referred to as the "logical I/O" routine. The logical I/O routine is stored in the resident portion of real memory map 54, and also by reference numeral 55D in the memory map of pseudo-machine 1. One function of the logical I/O routine is to effect storing of the subject data into buffer 55C.

A main function of the I/O dispatcher is to translate from a logical A address to a logical B address. The physical I/O driver then uses the B address.

The I/O driver sends out B map addresses.

The COBOL user program makes the above request by making a jump from user program area 55B of memory map 55 to the instructions comprising logical I/O routine 55D. The logical I/O routine then causes the block of data "stored" in buffer 55C to be transferred to the disk unit. In order to satisfy the request, the logical I/O routine calls a "block I/O" routine stored in portion 54F of the extended resident portion of real memory map 54. The block I/O routine 54F effects the actual transfer of the data temporarily "stored" in buffer 55C to the disk unit. (For convenience, the same reference numerals are utilized to refer to portions of the memory maps and the routines stored in those portions.)

In order to accomplish the block I/O transfer from buffer 55C to the disk unit, it is necessary for the block I/O routine to map addresses produced thereby through Table B (as all I/O addresses must be mapped in the system of FIG. 1). At this point, it must be understood that the block I/O routine always recognizes a particular group of logical addresses (in this example, those designated by reference numeral 59A of Table B) in FIG. 3A as being the addresses of the disk unit (or, more specifically, the disk controller) into which the data temporarily stored in buffer 55C is to be transferred. However, that data is actually stored in locations 54D of real memory 3, whereto it was earlier mapped by buffer 58A of Table A (FIG. 3A). Thus, it is necessary to load Table B with a "BDAT image" wherein disk buffer 59A contains the eleven bit page addresses for buffer 54D in real memory 3 before execution of the block I/O routine, so that the logical addresses utilized to transfer the block of data will be mapped through logical address locations 59A of Table B to real locations 54D of real memory 3. (Note that UDAT images which are loaded into Table A are hereinafter referred to as "ADAT images" and UDAT images which are loaded into Table B are hereinafter referred to as "BDAT images"). The data actually stored in locations 54D of real memory 3 then will be outputted onto the memory data bus to a disk controller (not shown) and routed to the proper disk locations.

Figure 4A:
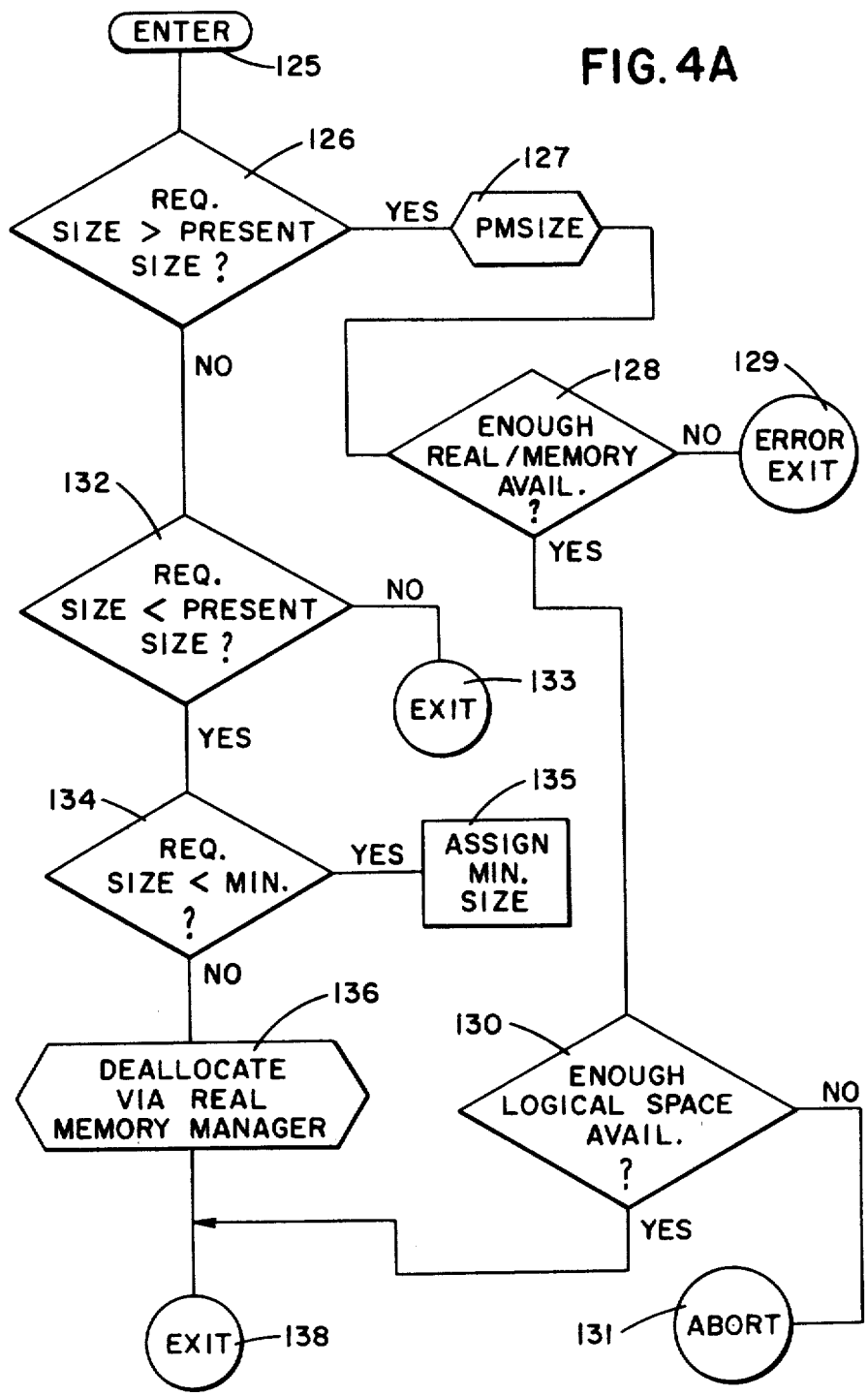
Figure 4B:
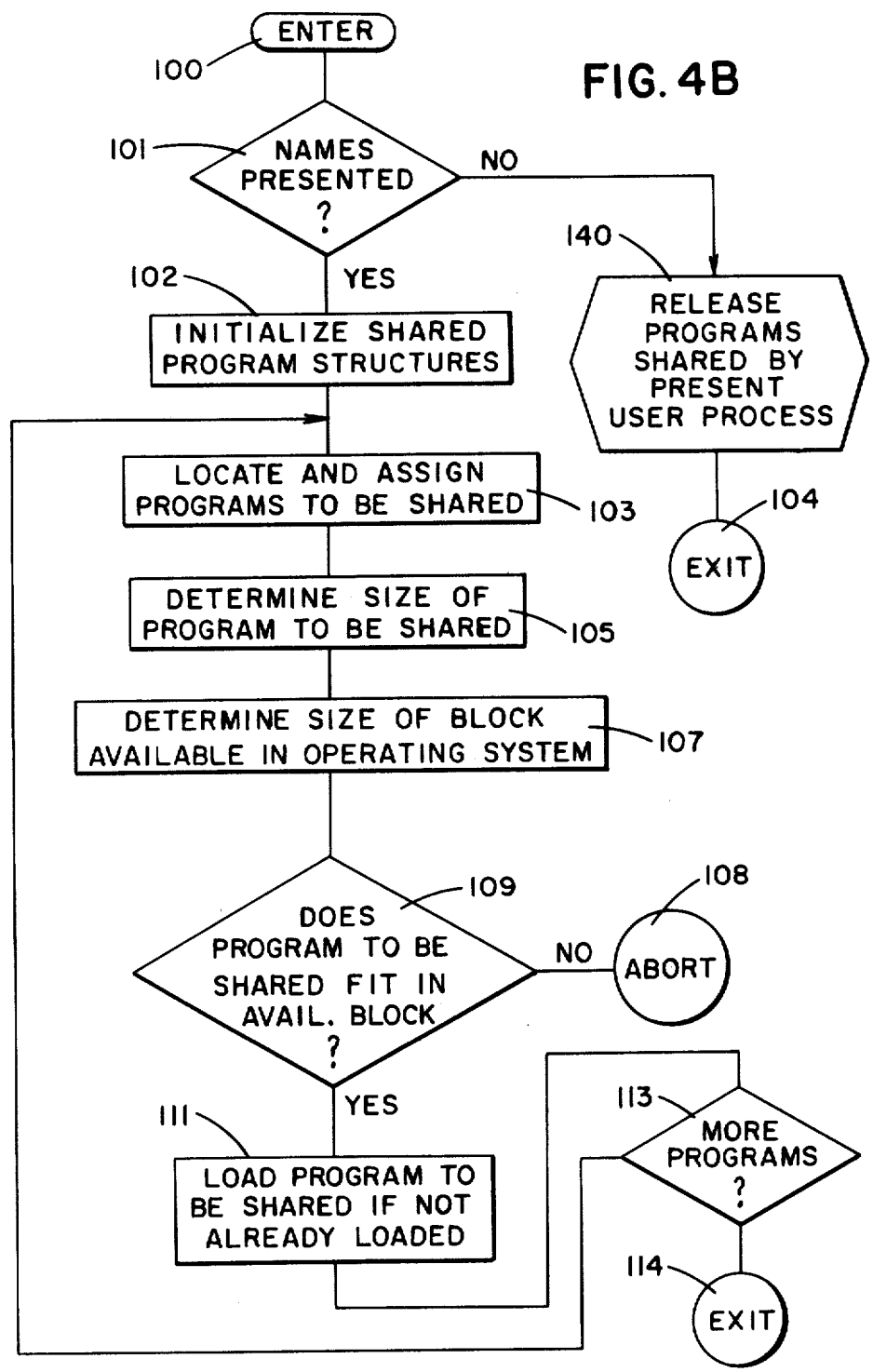
Figure 4C:
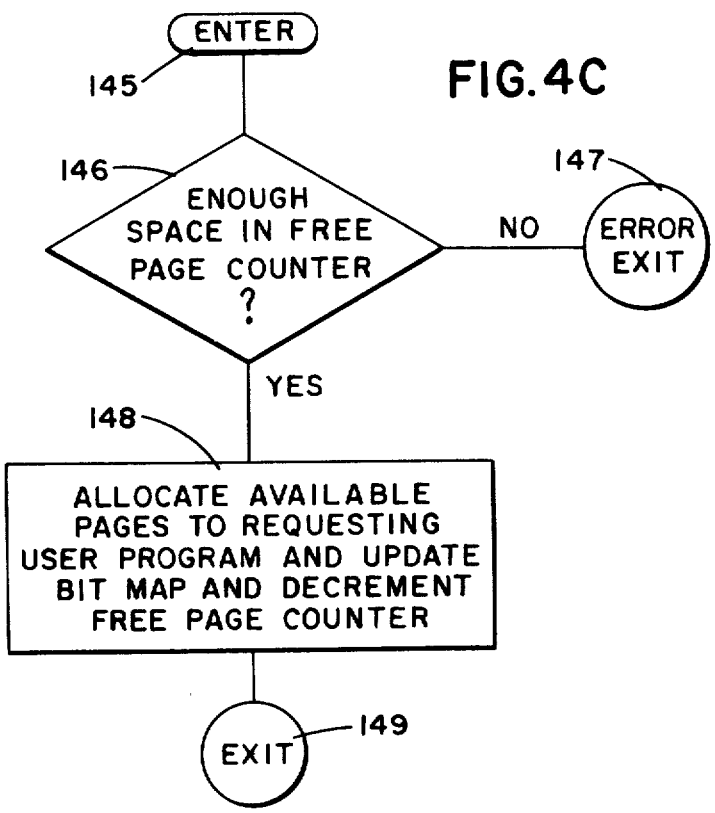
Figure 4D:
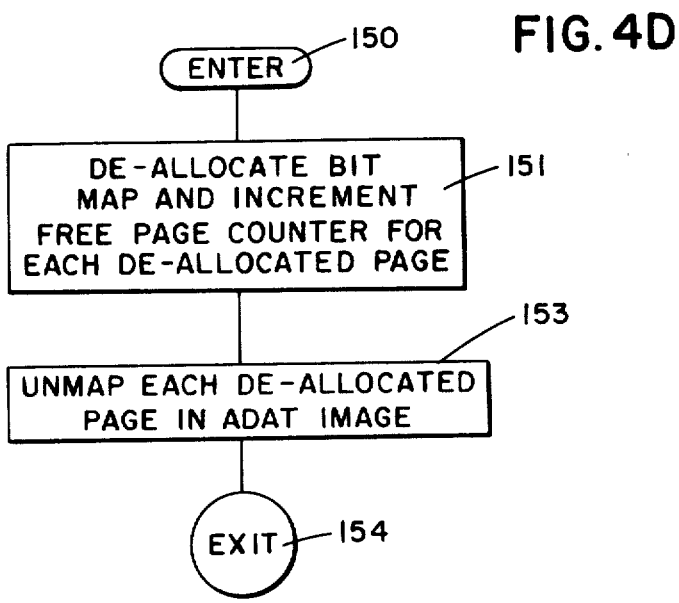
Figure 4F:
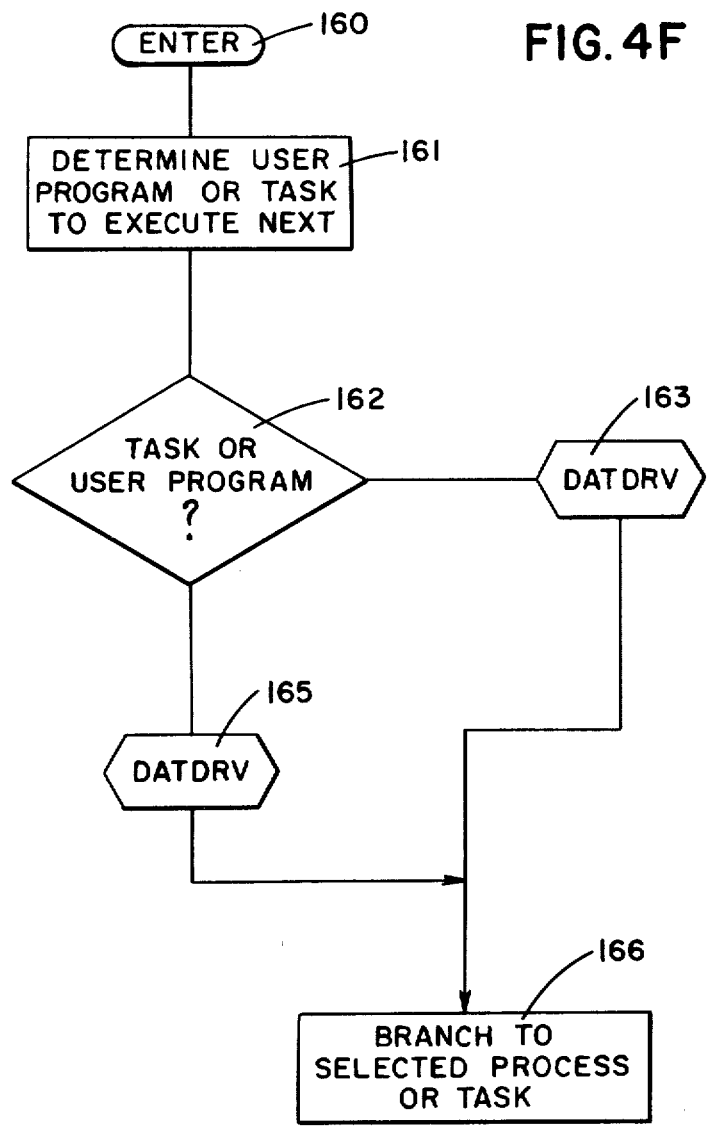
Figure 4G:
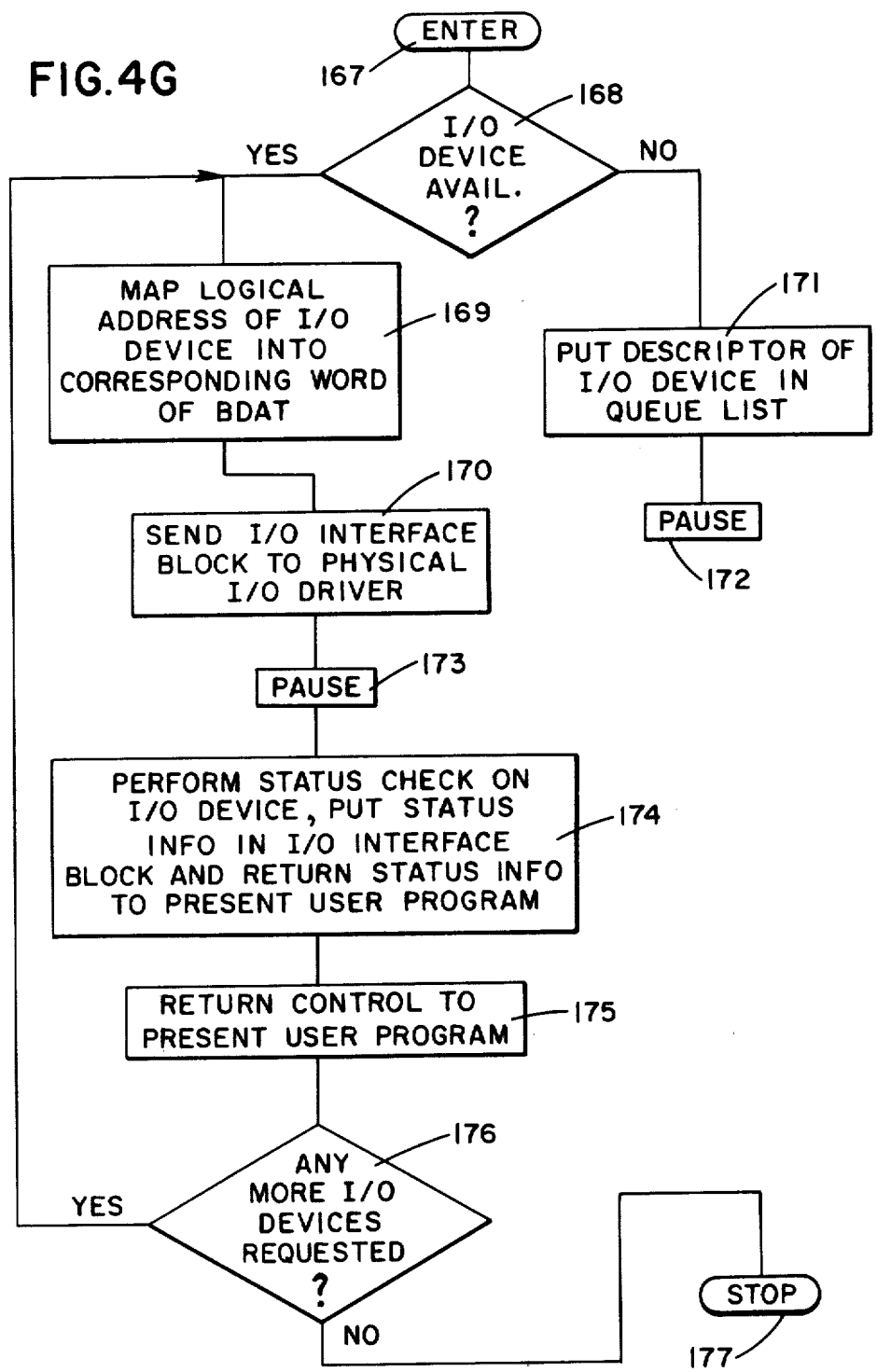

Stated differently, when the buffer is filled, a signal is sent to the block I/O routine, which calls up the "I/O dispatcher" routine of FIG. 4G. The I/O dispatcher routine produces logical addresses which result in the physical I/O driver routine (subsequently described) sending out "B map" addresses to the disc unit. Note that the logical addresses produced by the I/O dispatcher are "B map" logical addresses. Note that the "A map" logical addresses produced by the COBOL user program refer to exactly the same physical memory locations as the B map logical addresses produced by the I/O dispatcher, but the "A map" logical addresses are, in fact, different than the "B map" logical addresses. Therefore, it is necessary that there be a translation from the "A map" logical addresses to the "B map" logical addresses. The same real memory addresses therefore are needed to be loaded into both the ADAT and the BDAT image portions of the extended resident portion of real memory 3.

As previously mentioned, each time a different user program (i.e., a different pseudo-machine) is to be executed by processor 9, it is necessary to first load a corresponding UDAT image into Table A, so that the logical address space of the new pseudo-machine (other than the resident portion thereof) will be mapped into a different portion of real memory 3 than for any other pseudo-machine. For example, logical memory space 55B of pseudo-machine 1 in FIG. 3 is mapped into portion 54G of real memory map 3, and logical memory space 56B of pseudo-machine 2 is mapped into portion 54H of real memory map 54 in FIG. 3. In order to achieve this mapping of logical memory space 55B into portion 54G of real memory map 3, Table A must be first loaded with the ADAT image corresponding to pseudo-machine 1 before pseudo-machine 1 is executed. Similarly, the ADAT image corresponding to pseudo-machine 2 must be loaded into Table A before pseudo machine 2 is executed. The software which performs the above mentioned loading of ADAT images into Table A is called the "UDAT driver" and is stored in the extended resident portion of real memory 3. The UDAT driver also effects the loading of BDAT images into Table B as required to achieve desired mapping of various I/O routines.

In certain instances, it is necessary to temporarily halt execution of a user program in order to allow an I/O operation to occur wherein execution of the same user program will continue after the I/O operation is complete. The above described block I/O operation is an example of such operation. In such instance, it is necessary to switch the state of master mapping register 33 (FIG. 2) of UDAT 13 so that the logical addresses outputted by processor 9 are mapped through Table B instead of Table A; in such instances, there is, of course, no need to reload Table A.

It should be noted that when a different ADAT image must be loaded into Table A prior to execution of a different user program, only those page addresses stored in Table A which are to be used in execution of the different user program need to be changed. For example, those page addresses in the resident portion of Table A never need to be modified.

In order to efficiently use portion 54C of memory map 54, the above-described system avoids memory "contention" problems by mapping the logical address space of the various pseudo-machines into corresponding mutually exclusive portions of real memory 3 and by utilizing a memory management scheme which allocates and de-allocates mutually exclusive portions of real memory 3 to and from the various user programs. Each user program must initially "announce" to the system of FIG. 1 the amount of memory which will ever be required for execution of that user program. This is done by means of a command called a "SIZE" command. The SIZE command can be executed to allocate a particular amount of real memory 3 to a user program either at the time the user program is loaded into the system of FIG. 1 or when the SIZE command is encountered during execution of the user program. The maximum size which can be allocated to a user program is limited to the 65,536 word logical address space of processor 9. FIG. 4A shows a flow chart of the routine which is executed by processor 9 to effect execution of the SIZE command.

In FIG. 4A, the computer software enters block 125 in order to begin execution of the SIZE command routine when it is typed into a terminal connected to the system of FIG. 1. The first test made is whether or not an amount of real memory 3 requested for a particular pseudo-machine is greater than the current "size" of the pseudo-machine (i.e., number of pages of real memory required for execution of the pseudo-machine) to which the requested amount of real memory 3 is to be allocated if the request is granted. This is done in block 126. If the requested amount of real memory 3 is greater than the current size of the present pseudo-machine, a subroutine called PMSIZE is called as indicated in block 127. The PMSIZE subroutine first performs a test to determine the amount of logical address space available and the amount of real memory address space available. The PMSIZE routine calls a "real memory manager" routine, which performs the function of allocating real memory space to the requesting pseudo-machine. (The real memory manager routine also performs other steps necessary to effect the above-mentioned mapping of logical addresses by Table A, as subsequently explained, by calling up the "allocate" subroutine of FIG. 4C.) Then the SIZE routine enters decision block 128, and makes a determination of whether there is enough available (i.e., un-allocated) real memory address space to satisfy the present request. If there is not, then the SIZE routine is exited at an error exit 129. (The error exit causes a corresponding status signal to be sent back to the requester, indicating that the attempt to allocate real memory has failed. The requester may terminate the request or wait for enough real memory address space to become available).

If there is enough available real memory address space to satisfy the present request, decision block 128 directs on software to decision block 130, which makes a determination whether there is enough available logical address space to grant the present "size" request. If there is not enough available logical address space, the software causes an "abort" at label 131, because at this point, there is nothing that can be done to make it possible to grant the present "size" request.

If both of the tests of decision blocks 128 and 130 are "passed" affirmatively, this means that both real memory 3 and the "logical memory" have enough address space available to grant the present "size" request. The SIZE routine then is exited at point 138 and the software returns to a "command input" point and waits for the user to enter another command via a terminal keyboard (not shown).

Referring again to decision block 126, if the presently requested amount of real memory 3 is not greater than the current amount of memory already allocated to the requesting pseudo-machine, then the SIZE routine enters decision block 132, which "asks" whether the requested amount of real memory is less than the current amount of real memory already allocated to the requesting pseudo-machine. If the answer is "no", this means that the requested amount of real memory for the requesting pseudo-machine is exactly equal to the amount of real memory already allocated to the requesting pseudo-machine; in this trivial case, the software merely exits at point 133.

If the presently requested amount of real memory is indeed less than the current "size" of the requesting pseudo-machine, then the SIZE routine enters decision block 134, which determines if the requested "size" of the logical address space required for the requesting pseudo-machine is less than a predetermined minimum amount (which is approximately 8000 words); if so, that minimum amount is allocated to the requesting pseudo-machine, as indicated in block 135.

Next, the SIZE routine enters subroutine 136 to "de-allocate" the real memory space made available by the present request. Subroutine 136 calls up the "de-allocate" subroutine shown in FIG. 4D in order to accomplish this task, wherein the current size and a processor descripter are updated. The software then exists from the SIZE routine at label 138. A list of assembly language instructions used to implement the flow chart of FIGS. 4A–4G in the NCR 8200 computer is included in Appendix C. Details of the assembly language are available in a publication entitled "*Programmer's Reference Manual, NCR 605 EXEC I Operating System*" which is available from the NCR Corporation.

The above-mentioned "real memory manager" routine effects allocation of requested portions of real memory 3 to a requesting pseudo-machine, and also effects de-allocation of portions of real memory 3 if the amount of real memory presently allocated to a requesting pseudo-machine is greater than the new amount being requested. The real memory manager routine includes both of the above-mentioned "allocate" subroutine of FIG. 4C and the above-mentioned "de-allocate" subroutine of FIG. 4D. The real memory manager routine also maintains (i.e., updates) the previously mentioned "bit map". The bit map is a software structure which simply indicates which pages of real memory 3 are presently assigned to any pseudo-machine or other routine. The real memory manager also maintains and updates a "free page counter" which is a software structure which maintains an updated count of the total number of unallocated pages of real memory 3.

When the software enters the above-mentioned "allocate" subroutine, then it is necessary to allocate a portion of real memory 3 to the requesting pseudo-machine, so block 145 of FIG. 4C is entered. The "allocate" subroutine then determines in block 146 whether there are enough free (i.e., un-allocated pages in real memory 3 to satisfy the request. If not, the software makes an error exit at label 147. If there are enough free pages in the free page counter, block 148 is entered, wherein available pages of real memory 3 are allocated to the requesting user program. The bit map is updated and the free page counter is decremented accordingly. One skilled in the programming art can readily provide a list of instructions to effect the allocating task and the updating task shown in block 148. However, a list of instructions utilized in the NCR 8200 computer is included in Appendix E, attached hereto. The determination of which pages of real memory 3 to allocate is done by means of a subroutine called ALOCPG (listed in Appendix E) which scans the bit map to determine which pages are free, and then selects the necessary number (to satisfy the present SIZE request) of those pages to be allocated). Then, the "allocate" routine is exited at label 149.

If the results of execution of the SIZE routine require that a portion of real memory 3 be de-allocated from the requesting pseudo-machine (i.e, if the requesting pseudo-machine presently needs less real memory space than is already assigned to the requesting pseudo-machine), then the software enters the "de-allocate" subroutine of FIG. 4D at label 150. The "de-allocate" subroutine performs the function of de-allocating the desired portion of real memory 3, by updating the bit map, correspondingly incrementing the free page counter, and "erasing" corresponding pages from the ADAT image stored in Table A, by writing an "unmap code" into each "erased" page as indicated in block 153. The "de-allocate" subroutine then is exited at label 154. A list of instructions used to accomplish this in the NCR 8200 computer is shown in Appendix E. As previously mentioned, the method of un-mapping each de-allocated page (indicated in block 153) includes writing the "unmap code" in the "erased" pages of the ADAT image. The system hardware contains circuitry which recognizes the unmap code, and prevents mapping of any logical address through any address of Table A or Table B containing the unmap code, and further causes an "abort" operation to occur if the computer software (i.e., any list of instructions executed by processor 9) attempts to map a logical address through a word of Table A containing the unmap code.

A flow chart of the above-mentioned ALOCPG (allocate page) subroutine is shown in FIG. 4E. This subroutine is also included in the previously mentioned real memory manager routine. The ALOCPG subroutine first is entered at label 155 and then determines which logical addresses are to be utilized by the requesting pseudo-machine as it accesses the portion of real memory being requested by that pseudo-machine, as indicated by block 156. These logical addresses may be those which are located just above (i.e., at the next higher order group of address locations) the "resident" area 55A in FIG. 3, or they may be logical addresses located just above any logical address space previously allocated to the requesting pseudo-machine.

After the required logical address space required by the requesting pseudo-machine has been determined, the ALOCPG subroutine enters block 157 to determine which available real memory pages are to be allocated for mapping from the logical memory addresses selected in accordance with block 156. As indicated in block 157, the ALOCPG subroutine selects one free page from the bit map for each logical address allocated to the requesting pseudo-machine. Then, as indicated in block 158, each selected real memory page address is written into a corresponding location of the ADAT image (located in the extended resident portion of real memory 3), which location is addressable by the requesting pseudo-machine after the ADAT image is written into Table A). The ALOCPG subroutine is exited at label 159. The list of instructions for implementing the flow chart of FIG. 4E is also included in Appendix E.

During the process of creating a pseudo-machine (i.e., loading a particular user program into the system of FIG. 1 and setting up the system of FIG. 1 to execute that user program), it is possible to execute a SHARE command, which previously has been referred to herein. Although "implicit" sharing of user programs (wherein a particular user program is loaded only once into a system, even though a plurality of different users may be executing that same user program on a time-shared basis, resulting in a very large amount of memory being allocated to that user program) is known in the prior art, and has the advantages of allowing a particular program or routine to be utilized by a number of different programs, thereby reducing the "software overhead" of the system, implicit sharing systems aggravate the previously described memory shortage problems and reduce system reliability. In accordance with the present invention, a user program can, if desired, be "explicitly" shared with other user programs. A SHARE command is utilized to effect such explicit sharing. No user program which is not included in a SHARE command can be utilized by any other user program. The SHARE command is used to identify the list of user programs or other routines which can be used by other user programs in the system of FIG. 1. Each user program that "desires" to share other shared user programs in the system of FIG. 1 must list those desired user programs in its own SHARE command. When a SHARE command is encountered, the user program with which it is associated is loaded into real memory 3 and is mapped into the ADAT image of that user program. If the user program is already loaded as a shared program, then that user program is simply mapped into the current pseudo-machine address space.

The flow chart of FIG. 4B is a flow chart of a SHARE routine which effects the execution of the above-described SHARE command in the system of FIG. 1. The SHARE routine is entered at label 100. At this point, it should be noted that the SHARE command is entered by merely typing the command "SHARE", followed by the names of the user programs which the present user program wishes to "share", into the system via a terminal keyboard.

In decision block 101, the SHARE routine determines if any user program names have been typed in to the system of FIG. 1 along with the word "SHARE". If no such user program names have been entered, then all user programs are caused to be released from sharing by the present user program. This is accomplished by a subroutine indicated by block 140, which "unmaps" all such shared programs from the logical address space of the present user program. Further, if no other user programs are sharing the "shared" programs, the subroutine of block 140 also releases them (i.e., erases) from real memory 3. The SHARE routine then is exited via label 104.

If one or more user program or other routine or subroutine names have been entered along with the SHARE command, decision block 101 causes the SHARE routine to enter block 102, which initializes certain shared program software "structures" pertaining to the present particular user program for the purpose of marking or identifying the present user program as being a "shared" user program. Next, the SHARE routine enters blocks 103, which locates and assigns the user programs to be shared with the present user program.

Next, as indicated in block 105, it is necessary to determine the size of the user program to be shared. This is done in a manner entirely similar to the manner in which the previously described SIZE routine is executed in order to effect the mapping which is required to accomplish explicit sharing of various other programs of the present user program.

It is also necessary to determine if there is enough logical address space available in the present user program, as indicated in blocks 107 and 109. If there is not enough real memory space, as determined in decision block 109, i.e., if the user program requested to be shared by the present user program cannot be "fitted" into available real or logical memory space, there is an abort operation, as indicated by decision block 109 and abort label 108. If the user program requested to be shared has already been loaded, into real memory 3, then it is only necessary to map the user program to the UDAT images for those user programs with which the subject user program will be shared. The list of instructions for implementing the flow chart of FIG. 4B in the NCR 8200 computer is included in Appendix D.

The software of the system shown in FIG. 1 includes a conventional "scheduling" routine for performing the function of determining which user program or which I/O task to perform next. This frequently involves testing a priority list or queue list to determine which of the user programs or I/O tasks waiting to be executed has the highest priority. This type of scheduling routine is very common, and can easily be implemented in a wide variety of ways by those skilled in the programming art, and is only briefly indicated in blocks 160 and 161 of the scheduler routine flow chart of FIG. 4F. In the present extended memory computer system, however, user programs are mapped through Table A and I/O tasks are mapped through Table B. Therefore, the present scheduler routine must perform the function of loading the ADAT image or BDAT image corresponding to the user process or I/O task selected for next execution into the appropriate table (Table A or Table B) of UDAT 13 before the necessary mapping can occur during execution of the selected user program or I/O task. In order to perform this function, the scheduler routine determines whether the selected process is a user program or an I/O task, as indicated by decision block 162 in FIG. 4F. If the selected process is a user program, a subroutine called DATDRV is called to write the UDAT image corresponding to that user program into Table A, as indicated by block 165. If the selected process is an I/O task, the DATDRV subroutine is called to write the UDAT image corresponding to the selected I/O task into Table B (if necessary) as indicated by block 163. In either case, the DATDRV subroutine sets master mapping register 33 (FIG. 2A) to the state which results in mapping of logical addresses through the proper UDAT table. In either case, the scheduler routine then branches to the selected user program or I/O task. The list of instructions used to effect the flow chart of FIG. 4F in the NCR 8200 is included in Appendix G, and the list of instructions used to implement the DATDRV subroutine is included in Appendix H.

As previously mentioned, a block I/O routine operates to load a filled software buffer contained in the logical address space of a currently executing COBOL user program into a disk unit (which the COBOL user application believes it is addressing when it addresses the buffer). When this happens, the block I/O routine calls up a subroutine called the "I/O dispatcher", a flow chart of which is shown in FIG. 4G. This is the only portion of the block I/O routine which pertains to the present invention, and hence, is the only portion flow charted herein. One function of the I/O dispatcher subroutine is to set up Table B in order to effect mapping of the full COBOL user program buffer via Table B into the selected disk unit.

When the computer software enters the I/O dispatcher routine at label 167, the type of I/O access desired (i.e., read, write, rewind, etc.), the buffer's logical addresses, the number of bytes of data to be transferred from the full buffer to the disk unit, and the identification of the disk unit (or other I/O device) to which the block of data in the full buffer is to be transferred are "known" to the block I/O routine. In decision block 168, the I/O dispatcher determines if the I/O device to which access has been requested is available; if it is not available, a descriptor of that I/O device is placed in a queue list (the details of which are not pertinent to this invention, but can be easily supplied by those skilled in the art), as indicated in block 171. The I/O dispatcher then enters a "pause" loop (indicated by reference numeral 172) and gives up control of processor 9. In this manner, the system waits for the selected I/O device to become available.

If the requested I/O device is available, the I/O dispatcher enters block 169 and maps the logical address of the requested I/O device into the corresponding word or words of Table B. This means that the logical addresses of the selected I/O device (i.e., the disk unit, which herein includes a conventional disk controller) is translated by Table B into the same real memory addresses into which the user program previously mapped the logical buffer addresses via Table A. The necessary real memory buffer addresses have, of course, been previously loaded into the BDAT image.

Next, the I/O dispatcher enters block 170, and sends the "I/O interface block" to a software routine referred to as the "physical I/O driver". The I/O interface block is stored in resident memory. The I/O interface block is simply a portion of memory utilized to communicate between different processes, and in this case, between a user program and an I/O task. The physical I/O driver is a list of executable codes which operate through the BDAT. The interface block of block 170 in FIG. 4G includes the address of the buffer, the size of the buffer, and a function code such as a read disc, write disc, etc. Then the I/O dispatcher pauses, as indicated in block 173. After a suitable delay, the I/O dispatcher enters block 174 and performs a status check to determine whether the I/O transfer operation was successful. The status information is entered into the I/O interface block and returned to the present user program. Then the I/O dispatcher returns control of processor 9 to the present user program, as indicated in block 175. In decision block 176, the I/O dispatcher re-examines the queue list and re-enters block 169 if there are any more I/O devices available for which there are requests in the queue list. If there are not any such I/O devices available, then the I/O dispatcher halts, as indicated by label 177. A list of instructions implementing the I/O dispatcher in the NCR 8200 computer is included in Appendix A.

It should be noted that the portions of the attached Appendixes which correspond to the various blocks in the above described flow charts are identified by the same reference numerals used to identify the corresponding blocks in the respective flow charts.

A system generation routine called SYSGEN initially determines the size of real memory 3, stores this information in the object module, and asks the user to type in information pertaining to each peripheral input/output device connected to the system. SYSGEN is a program which initially produces an "operating system" for a particular system configuration of peripheral devices and terminals. Normally, once SYSGEN is executed, it does not need to be executed again unless the user adds a new piece of equipment to the computing system. The SYSGEN program creates various software structures which define the configuration of the system. This includes creating the real memory locations under which the ADAT and BDAT images can be loaded. This information is utilized by the SYSINT routine, described below, in order to generate the information stored in Table B. A list of instructions for the NCR 8200 for accomplishing this function is indicated by reference numeral 202 and 203 in Appendix A. The SYSGEN routine is written in a programming language called TUTOR, details of which are set forth in a document entitled "*TUTOR DIRECTIVES*", available from NCR Corporation. The SYSGEN routine also creates the ADAT image areas in the object module. The list of instructions performing this function is indicated by reference numerals 204 and 205 in Appendix A.

As is well known, computing systems usually require that a "start-up" routine be executed after operating power is applied to the computing system in order to properly initialize the computing systems so that user programs can be executed. Such "start-up" routines can be easily provided by those skilled in the art for various computing systems. In the extended memory system of FIG. 1, a "start-up" routine, which is called SYSINT, is executed at the beginning of every day (assuming the system is not left on all night). The start of day program causes the real memory manager routine to generate the bit map with all zeros each day, and the bit map is updated as the user programs are loaded from the disc unit into the computing system, using the size and share commands, as required by various users. A list of instructions for accomplishing this task is identified by reference numeral 250 in Appendix B. Another task performed by the SYSINT routine is to initialize Table A by loading of translation words into Table A which translation words include the actual addresses of the various input/output devices connected to the computing system. A list of instructions for the NCR 8200 which accomplish this function is indicated by reference numeral 251 in Appendix B.

Although the invention has been described with reference to a particular embodiment thereof, those skilled in the art will be able to make various modifications to the described structure and method without departing from the true spirit and scope of the invention, as set forth in the appended claims.

We claim:

1. A method for operating an expanded memory computing system, said method comprising the steps of:
   (a) allocating a first portion of a first memory for execution of a first user program;

(b) loading said first user program into said first portion of said first memory;

(c) loading a first group of real addresses of said first portion of said first memory into a second memory;

(d) executing each instruction of said first user program by utilizing a processor to produce a logical address for that instruction, utilizing that logical address to fetch a real address of said first group from said second memory, and utilizing that real address to access a location in said first portion of said first memory;

(e) allocating a second portion of said first memory for execution of a second user program, said first and second portions being mutually exclusive;

(f) loading said second user program into said second portion of said first memory;

(g) loading a second group of real addresses of said second portion of said first memory into said second memory; and (h) executing each instruction of said second user program by utilizing said processor to produce a logical address for that instruction, utilizing that logical address to fetch a real address of said second group from said second memory and utilizing that real address to access a location in said second portion of said first memory;

said allocating step (a) comprising the steps of:

(i) requesting a first amount of said first memory to be allocated for execution of said first user program; and (j) determining the amount of said first memory which is unallocated to any user programs and allocating said first amount for execution of said first user program only if said unallocated amount is greater than or equal to said requested first amount; and said allocating step (e) comprising the steps of:

(k) requesting a second amount of said first memory to be allocated for execution of said second user program; and (l) determining the amount of said first memory which is unallocated to any user programs and allocating said second amount for execution of said second user program only if said unallocated amount is greater than or equal to said requested second amount.

2. The method of claim 1 also including the steps allocating a plurality of additional portions of said first memory for execution of a plurality of respective additional user programs, each of said first, second, and additional portions being mutually exclusive and with said additional portions being allocated in a manner corresponding to steps (i) and (j).

3. The method of claim 1 wherein steps (e) and (f) are performed prior to step (d).

4. The method of claim 1 wherein at least some of said second group of real addresses are loaded into the same portion of said second memory as said first group of real addresses, said loading of said second group of real addresses including erasing at least part of said first group of addresses from said second memory.

5. The method of claim 1 including the step of creating a bit map in a third portion of said first memory which is arranged in pages, said bit map including a plurality of bits for storing information indicating whether each said page in a predetermined portion of said first memory is allocated for execution of any said user program.

6. The method of claim 5 wherein said allocating steps include utilizing said bit map to select previously unallocated pages of said first memory and storing logical "ones" in locations of said bit map corresponding to said selected pages.

7. A method for operating an expanded memory computing system, said method comprising the steps of:

(a) allocating a first portion of a first memory for execution of a first user program;

(b) loading said first user program into said first portion of said first memory;

(c) loading a first group of real addresses of said first portion of said first memory into a second memory;

(d) executing each instruction of said first user program by utilizing a processor to produce a logical address for that instruction, utilizing that logical address to fetch a real address of said first group from said second memory, and utilizing that real address to access a location in said first portion of said first memory;

(e) allocating a second portion of said first memory for execution of a second user program, said first and second portions being mutually exclusive;

(f) loading said second user program into said second portion of said first memory;

(g) loading a second group of real addresses of said second portion of said first memory into said second memory;

(h) executing each instruction of said second user program by utilizing said processor to produce a logical address for that instruction, utilizing that logical address to fetch a real address of said second group from said second memory and utilizing that real address to access a location in said second portion of said first memory;

(i) writing a system operating program into a third portion of said first memory, said third portion being exclusive of said first and second portions, said third portion being a lowest order portion of said first memory; and (j) loading an input/output program in a fourth portion of said first memory, loading a third group of real addresses of said fourth portion of said first memory into a third memory, and for each instruction of said input/output program, utilizing said processor to produce a logical address to fetch a real address from said third memory and utilizing that real address to access a location in said fourth portion of said first memory.

8. The method of claim 7 further including the steps of utilizing said processor to produce a first group of logical addresses and utilizing said first group of logical addresses to fetch a fourth group of real addresses, and utilizing said fourth group of real addresses to access said first memory, said first group of logical addresses being included in a predetermined portion of said third portion, of said first memory, said predetermined portion being substantially smaller than said third portion, of said first memory, said fourth group of real addresses including real addresses of any portion of said first memory.

9. The method of claim 7 wherein said first user program is written in a programming language, said method including effecting transfer of data between a disk unit and said processor by loading a fourth group of real addresses in both said second memory and said third memory, utilizing said processor to produce a first group of logical addresses utilizing said first group of logical addresses to fetch a fifth group of real addresses from said second memory in response to instructions of said programming language of said first user program, each of said fifth group of real addresses being exclusive of said second, third, and fourth portions of said first memory, utilizing said fifth group of real addresses to effect writing of said data into locations of said first memory addressed by said fifth group of real addresses, utilizing said processor to produce a second group of logical addresses, utilizing said second group of logical addresses to fetch said fifth group of real addresses from said third memory, and utilizing that fifth group of real addresses to read said data from said first memory and effect transferring of said data to either said processor or said disk unit.

10. The method of claim 9 wherein step (a) includes:
requesting a first amount of said first memory to be allocated for execution of said first user program;
determining the amount of said first memory which is unallocated to any user programs and allocating said first amount for execution of said first user program only if said unallocated amount is greater than or equal to said requested first amount.

11. The method of claim 10 wherein step (a) further includes determining if said first amount is less than a second amount of said first memory presently allocated for execution of said first user program, and if so, allocating said first amount for execution of said first user program and de-allocating an amount of said first memory equal to the difference between said first and second amounts of said first memory.

12. The method of claim 2 wherein execution of said first user program includes loading a third group of real addresses into a portion of said second memory not occupied by said first and second groups of real memory addresses, and executing a third user program, said third user program being executed in a third portion of said first memory, said third portion of said first memory including locations addressable by said third group of real addresses, whereby said first user program shares a program consisting of instructions being addresses included in said third group of real addresses.

* * * * *